United States Patent
Matthiesen et al.

(10) Patent No.: US 8,910,684 B2
(45) Date of Patent: Dec. 16, 2014

(54) TIRE INNERLINER WITH IMPROVED RESISTANCE TO AIR PERMEABILITY

(75) Inventors: Mary M. Matthiesen, Lakewood, OH (US); Amy Randall, Akron, OH (US); Mindaugas Rackaitis, Massillon, OH (US)

(73) Assignee: Bridgestone Corporation, Tokyo (JP)

( * ) Notice: Subject to any disclaimer, the term of this patent is extended or adjusted under 35 U.S.C. 154(b) by 431 days.

(21) Appl. No.: 12/495,020

(22) Filed: Jun. 30, 2009

(65) Prior Publication Data

US 2010/0000646 A1 Jan. 7, 2010

Related U.S. Application Data

(60) Provisional application No. 61/078,155, filed on Jul. 3, 2008, provisional application No. 61/079,638, filed on Jul. 10, 2008.

(51) Int. Cl.

| | | |
|---|---|---|
| *B60C 5/14* | (2006.01) | |
| *B60C 1/00* | (2006.01) | |
| *C08K 3/38* | (2006.01) | |
| *C08L 23/28* | (2006.01) | |
| *C08L 15/02* | (2006.01) | |
| *C08L 21/00* | (2006.01) | |
| *C08L 7/00* | (2006.01) | |
| *C08K 3/04* | (2006.01) | |

(52) U.S. Cl.
CPC ............. *B60C 1/0008* (2013.04); *C08L 23/283* (2013.01); *C08L 15/02* (2013.01); *C08L 7/00* (2013.01); *C08K 3/38* (2013.01); *C08K 3/04* (2013.01); *C08L 21/00* (2013.01); *Y10S 152/16* (2013.01)
USPC .................... 152/510; 152/DIG. 16; 523/166; 524/404

(58) Field of Classification Search
CPC ................................ B60C 1/0008; C08K 3/38
USPC ........... 524/404; 152/510, DIG. 16; 523/166; 428/36.8
See application file for complete search history.

(56) References Cited

U.S. PATENT DOCUMENTS

| | | | |
|---|---|---|---|
| 2,871,216 A * | 1/1959 | Anderson, Jr. ................ | 524/404 |
| 3,050,490 A | 8/1962 | Nitzsche et al. | |
| 5,178,702 A | 1/1993 | Frerking, Jr. et al. | |
| 5,755,899 A | 5/1998 | Hecker et al. | |
| 5,925,702 A | 7/1999 | Hecker et al. | |
| 6,591,879 B1 * | 7/2003 | Beckmann et al. ........... | 152/153 |
| 6,762,395 B2 * | 7/2004 | Yagnik et al. ................. | 219/540 |
| 7,351,769 B2 | 4/2008 | Park | |
| 2004/0089388 A1 | 5/2004 | Fujino et al. | |
| 2005/0027057 A1 * | 2/2005 | Dias et al. ..................... | 524/445 |
| 2007/0054122 A1 * | 3/2007 | Paisner et al. ................ | 428/403 |

FOREIGN PATENT DOCUMENTS

| | | | |
|---|---|---|---|
| EP | 0763563 A1 | | 4/1996 |
| EP | 1419903 A1 | | 5/2004 |
| JP | 2004-143366 | * | 5/2004 |

OTHER PUBLICATIONS

Momentive Performance Materials PolarTherm® Boron Nitride Powder Grades PT120, PT140, PT160, and PT180, 2006.*
English machine translation of JP2004-143366, dated May 2004.*

* cited by examiner

*Primary Examiner* — Justin Fischer
*Assistant Examiner* — Robert Dye
(74) *Attorney, Agent, or Firm* — Meredith E. Hooker; Arthur M. Reginelli

(57) ABSTRACT

A tire comprising an innerliner, where the innerliner includes a rubber and boron nitride dispersed within the rubber.

19 Claims, 1 Drawing Sheet

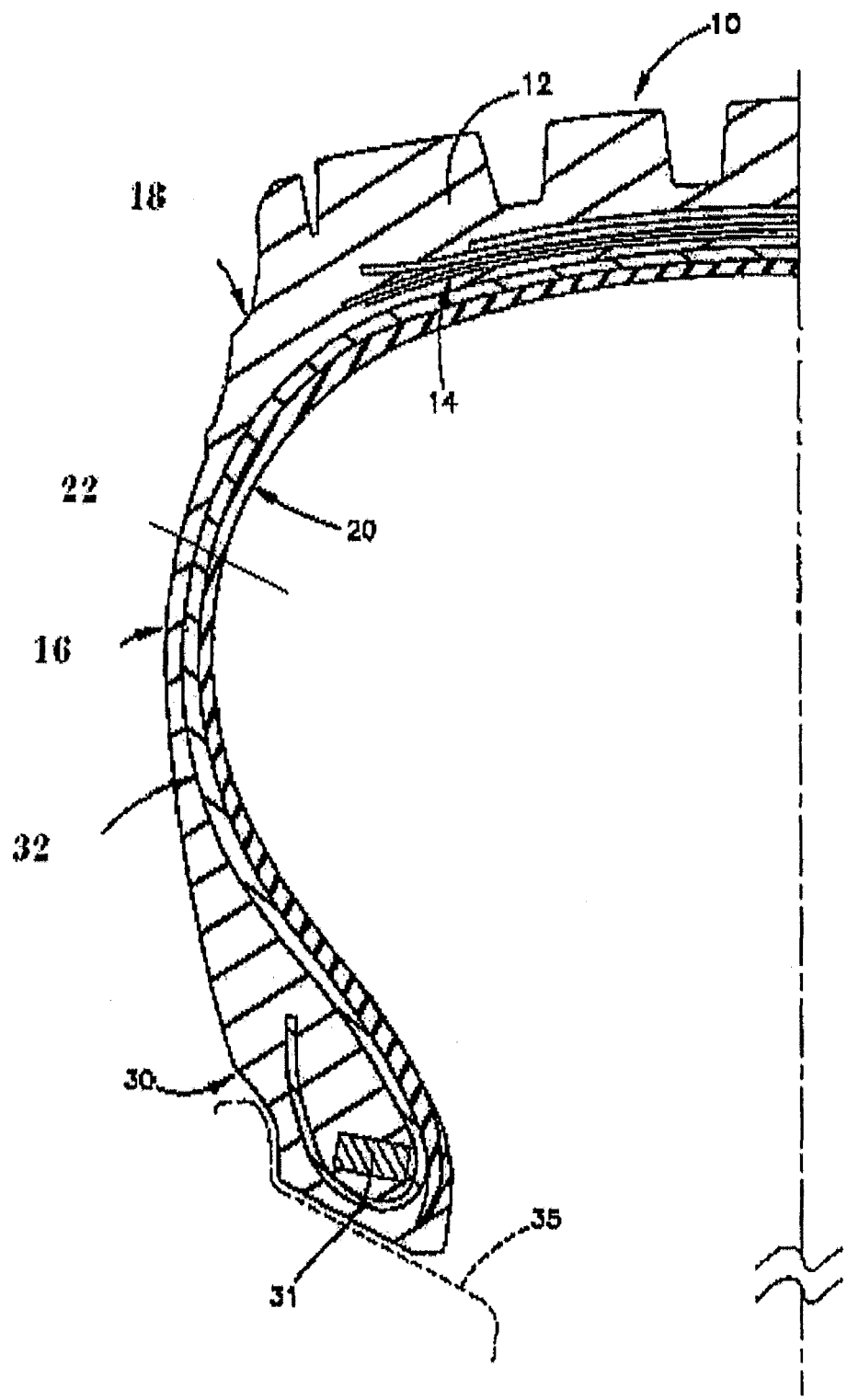

TIRE INNERLINER WITH IMPROVED RESISTANCE TO AIR PERMEABILITY

This application claims the benefit of U.S. Provisional Application Ser. Nos. 61/078,155 filed Jul. 3, 2008 and 61/079,638, filed Jul. 10, 2008, and are incorporated herein by reference.

FIELD OF THE INVENTION

One or more embodiments of this invention relate to tire formulations for innerliners.

BACKGROUND OF THE INVENTION

The inner surface of a pneumatic tire may include an elastomeric composition designed to prevent or retard the permeation of air from the tire's inner air chamber. This elastomeric composition is often referred to as an innerliner. Rubbers, such as butyl and halobutyl rubber, which are relatively impermeable to air, are often used as the primary rubber component in innerliners.

The innerliner may comprise a relatively thin sheet of elastomer that is formulated with compounding additives and a curing system. The elastomer formulation may be laminated to the inner surface of a tire carcass layer of an uncured tire as the tire is formed on a tire building drum. Final cure of the composite structure produces a tire having a cured innerliner adhered to the carcass.

Properties that are desirable for innerliners include good resistance to air permeation, flex resistance, and adhesion to the tire carcass.

SUMMARY OF THE INVENTION

A tire comprising an innerliner, where the innerliner includes a rubber and boron nitride dispersed within the rubber.

BRIEF DESCRIPTION OF THE DRAWINGS

FIG. 1 is a half cross-sectional view of a tire according to one or more embodiments of this invention.

DETAILED DESCRIPTION OF ILLUSTRATIVE EMBODIMENTS

One or more embodiments of the present invention relate to tire innerliner formulations and tires prepared using these innerliner formulations. The innerliner formulations, which may be referred to as vulcanizable compositions, include boron nitride. Where the innerliner formulation is cured, the boron nitride may be dispersed throughout the cured innerliner vulcanizate.

An example of a tire according to the present invention is shown in FIG. 1. Tire 10 includes a tread portion 12, a belt package 14, a sidewall 16, shoulder portion 18, an innerliner ply 20, cavity 22, and a bead portion 30 that includes a bead core 31. Carcass 32 extends between bead portion 30 and a complementary bead not shown. Bead core 31 helps to hold bead portions 30 against vehicle rim 35. Pneumatic tires can be made as discussed in U.S. Pat. Nos. 5,866,171, 5,876,527, 5,931,211, and 5,971,046, which are incorporated herein by reference.

In one or more embodiments, the vulcanized innerliner becomes an integral part of the tire by being co-cured therewith. In one or more embodiments, the innerliner is cured to and is thereby adhered to the adjacent tire component (e.g., carcass) to an extent that the resulting laminate passes industry standards for adhesion such as may be determined by blow point analysis.

In one or more embodiments, the cured innerliner has a thickness ranging from about 0.02 to about 0.35 cm, and in other embodiments from about 0.04 to about 0.15 cm.

In one or more embodiments, the innerliner may be prepared by using conventional practices. In one or more embodiments, the innerliner of the present invention is prepared from a vulcanizable composition that may be shaped through conventional calendering or milling techniques to form a strip of uncured compounded rubber (i.e. green rubber) of appropriate width, which is sometimes referred to as a gum strip. The gum strip may be the first element of the tire applied to a tire building drum, over and around which the remainder of the tire is built. In other embodiments, the innerliner may be incorporated into a subassembly with another tire component before placing it on the drum. When the tire is cured, the innerliner may become an integral, co-cured, part of the tire. Tire innerliners and their methods of preparation are well known to those having skill in the art.

In one or more embodiments, a vulcanizable innerliner composition may be formed into a layer or sheet. As known to those skilled in the art, the layer may be produced by a press or passing a rubber composition through a mill, calender, multihead extruder or other suitable means. In one or more embodiments, the layer is produced by a calender. The uncured layer sheet may then be constructed as an inner surface of an uncured rubber tire structure, which may be referred to as a carcass.

Practice of the present invention does not necessarily impact the thickness of the innerliner. In one embodiment, the innerliner of the present invention has an uncured gum thickness in the range of from about 0.02 to about 0.5 cm, in other embodiments from about 0.03 to about 0.45 cm, in other embodiments from about 0.04 to about 0.4 centimeters, in other embodiments from about 0.05 to about 0.2 cm, and in other embodiments from about 0.08 to about 0.02 cm.

In one or more embodiments, the uncured layer may be co-cured with the tire carcass, as well as with the other components of the tire, during the tire curing operation under conditions of heat and pressure. Any vulcanization process known in the art may be used. For example, these processes may include heating in a press or mold, heating with superheated steam or hot salt, or in a salt bath. In one embodiment, the heating is accomplished in a press or mold. In other embodiments, radiation cure may be employed. The conditions of cure can be readily selected by those of skill in the art to achieve appropriate cure of the various tire components.

In one or more embodiments, the vulcanizable innerliner composition that is employed to prepare the green tire innerliner discussed above includes a rubber component and a filler component. The filler component includes boron nitride. The vulcanizable innerliner composition may also include other components that are commonly employed in the art of making vulcanizable innerliner compositions including a cure system.

In one or more embodiments, the rubber component of the vulcanizable innerliner composition may include one or more polymers that are capable of being crosslinked or vulcanized; these polymers may be referred to as rubbery polymers or elastomers. In one or more embodiments, the rubbery polymers are selected based upon their properties of low permeability to gases, good vibration damping, good heat, chemical, ozone, and oxidation resistance. In one or more embodiments, the vulcanizable innerliner compositions may include isobutylene-based elastomers. These elastomers may be used alone or in conjunction with other elastomers. The other elastomers may include natural and synthetic elastomers.

Isobutylene-based elastomers include polyisobutylene homopolymers, isobutylene/isoprene copolymers, and halogenated derivatives thereof. Iso-butylene-based elastomers further include halogenated isobutylene-p-methylstyrene copolymers. Iso-butylene-based elastomers and their halogenated derivatives are sometimes referred to as "butyl rubber" and "halobutyl rubber," respectively.

Commercially available butyl rubber includes poly(methylpropene-co-2-methyl-1,3 butadiene) and poly(isobutylene-co-isoprene).

In one or more embodiments, the butyl rubber is prepared by copolymerizing butylene and isoprene. The relative amounts of these monomers will determine the mole percent unsaturation of the resulting copolymer. In other words, the mole percent of isoprene in the copolymerization will correspond to the mole percent unsaturation in the copolymer. In one or more embodiments, the iso-butylene-based elastomer may have a mole percent unsaturation of less than about 3, in other embodiments, less than about 2.5, and in other embodiments, less than about 2.

Halobutyl rubber may include chlorobutyl rubber (CIIR), bromobutyl rubber (BIIR), or mixtures thereof. In one or more embodiments, the halobutyl rubber may include from about 0.5 to about 5 percent by weight halogen, in other embodiments from about 0.7 to about 4 percent by weight halogen, and in other embodiments from about 1 to about 3 percent by weight halogen, based upon the total weight of the halobutyl rubber.

In one or more embodiments, the rubber component of vulcanizable composition includes from about 60 to about 100 percent by weight, or in other embodiments from about 80 to about 100 percent by weight halobutyl rubber. In other embodiment from 80 to about 100 phr halobutyl rubber is employed in the rubber component. In one or more embodiments, at least 80% by weight, in other embodiments at least 90% by weight, in other embodiments at least 95% by weight, and in other embodiments at least 99% by weight of the rubber component of the vulcanizable composition includes a halogenated rubber (e.g. halobutyl rubber).

In one or more embodiments, the vulcanizable composition further includes natural rubber. In one embodiment, natural rubber is present in an amount of from about 0 to about 60 percent by weight (wt. %) of the total rubber component of the formulation, and in other embodiments from about 0 to about 40 percent by weight, and in other embodiments from about 0 to about 20 percent by weight of the total rubber component. In another embodiment, from about 5 to about 50 percent by weight (wt. %) of the rubber component of the formulation is natural rubber.

In one or more embodiments, vulcanizable compositions employed in the present invention include both halo-butyl rubber and natural rubber. In one or more embodiments, the weight ratio of halo-butyl rubber to natural rubber may be at least 1:1, in other embodiments at least 2:1, in other embodiments at least 4:1, in other embodiments at least 7:1, in other embodiments at least 8:1, in other embodiments at least 8.5:1, and in other embodiments at least 9.0:1. In these or other embodiments, the weight ratio of halo-butyl rubber to natural rubber may be less than 9.8:1, in other embodiments less than 9.5:1, and in other embodiments less than 9.0:1.

In one or more embodiments, the vulcanizable innerliner compositions may include synthetic polymers such as, but not limited to, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, and epichlorohydrin rubber. In one or more embodiments, these synthetic polymers may be used alone as the rubber to form the rubber component of the vulcanizable composition. In other embodiments, they may be used together with the isobutylene-based rubber to form the rubber component of the vulcanizable composition. In other embodiments, the synthetic polymers may be used in conjunction with the isobutylene-based polymer and the natural rubber to form the rubber component of the vulcanizable composition.

As described above, the filler component of the vulcanizable compositions of the present invention includes boron nitride. Boron nitride is a chemical compound with the molecular formula BN. In addition to the boron nitride, the filler component may include other fillers including reinforcing fillers.

Various forms of boron nitride may be employed in practicing the present invention. As those skilled in the art appreciate, boron nitride is a synthetically engineered material that is commercially available as particles in powder or pellet form. They are also available in a variety of shapes, sizes, and crystal structures.

In one or more embodiments, the boron nitride is characterized by a hexagonal crystal structure. In other embodiments, the boron nitride is characterized by a cubic crystal structure. In certain embodiments, the boron nitride may be characterized as having a plate-like geometry or structure. In other embodiments, the boron nitride may be characterized by having a random geometry or particle size. In other embodiments, the boron nitride may be characterized by a generally spherical structure or geometry.

In one or more embodiments, the boron nitride is in the form of particles that may be characterized by the mean size of their largest dimension. In one or more embodiments, the mean size of their largest dimension, which may also be referred to as mean particle size, may be at least 0.01 µm, in other embodiments at least 0.1 µm, in other embodiments at least 1 µm, in other embodiments at least 3 µm, in other embodiments at least 5 µm, in other embodiments at least 7 µm, in other embodiments at least 10 µm, in other embodiments at least 15 µm, in other embodiments at least 20 µm, in other embodiments at least 30 µm, and in other embodiments at least 50 µm. In these or other embodiments, the mean size of their largest dimension may be less than 150 µm, in other embodiments less than 100 µm, in other embodiments less than 75 µm, in other embodiments less than 50 µm, in other embodiments less than 25 µm, and in other embodiments less than 15 µm.

Where the boron nitride generally has a plate-like structure, the size of the particles may be described with respect to the size or length of the largest dimension or length of the particle. Further definition may be provided from the aspect ratio, which may be defined as the ratio of the smallest dimension or length of the particle to the largest dimension or length of the particle.

In one or more embodiments, the largest dimension of the plate-like particles of boron nitride may be between 20 and 90 µm. In one or more embodiments, at least 60%, in other embodiments at least 70%, and in other embodiments at least 80% of the particles of plate-like boron nitride employed in the present invention may be characterized by having a largest dimension between about 20 and about 90 µm.

In these or other embodiments, the aspect ratio (i.e. largest dimension to the smallest dimension) of the plate-like boron nitride particles employed in the present invention may be at least 80:1 (where 81:1 is greater than 80:1), in other embodiments at least 100:1, and in other embodiments at least 120:1. In these or other embodiments, the aspect ratio may be less than 200:1, in other embodiments less than 180:1, and in other embodiments less than 160:1.

Specific examples of boron nitride believed to be characterized by a random structure include those available from Momentive Performance Materials PolarTherm under the tradename PT110, which is a powder grade, large single crystal powder in the typical hexagonal platelet (graphite-like) shape. The boron nitride of this product possesses an average particle size of about 45 μm and a low surface area of ~0.6 m2/g. Other examples include those available under the tradename PT111 (Momentive), which is similar to PT110 but screened to remove+200 mesh particles (>74 μm).

Where the boron nitride generally has a random geometry, the size of the particles may be described with respect to the size or length of the largest dimension or length of the particle. In one or more embodiments, the largest dimension of these randomly-shaped particles of boron nitride may be between 1 and 25 μm. In one or more embodiments, at least 60%, in other embodiments at least 70%, and in other embodiments at least 80% of the randomly-shaped particles of boron nitride employed in the present invention may be characterized by having a largest dimension between about 3 and about 25 μm.

In other embodiments, the boron nitride may be characterized as a nano particle. In one or more embodiments, the largest dimension of these nano particles of boron nitride may be between 0.001 μm and 1 μm. In one or more embodiments, at least 60%, in other embodiments at least 70%, and in other embodiments at least 80% of the nano particles of boron nitride employed in the present invention may be characterized by having a largest dimension between about 0.001 μm and about 1 μm.

Specific examples of boron nitride believed to be characterized by a plate-like structure include those available from Momentive Performance Materials under the tradenames HCP, HCPH, HCPL, and AC6004.

Fillers that may be employed in conjunction with the boron nitride include inorganic and organic fillers. The organic fillers may include, without limitation, carbon black, starch, carbon fibers, aramid fibers, and nano particles as described in U.S. Pat. Nos. 7,238,751 and 7,179,864, which are incorporated herein by reference. The inorganic fillers may include silica, aluminum hydroxide, magnesium hydroxide, clays (hydrated aluminum silicates), chemically-functionalized fillers, such as chemically-functionalized clays, and mixtures thereof. In particular embodiments, the filler includes a non-reinforcing or coarse carbon black. As is known in the art, these carbon black fillers may be those generally classified as coarser than N300 series black per ASTM D-1765 (e.g. N550).

The cure system may include a multitude of rubber curing agents including, but not limited to, sulfur-based compounds, metal oxide, or peroxide-based curing systems. Vulcanizing agents may be used alone or in combination. Sulfur-based compounds include those compounds conventionally employed in the art of making tires. These compounds may also be referred to as sulfur or sulfur crosslinking agents. In one or more embodiments, sulfur includes free sulfur, which may also be referred to as elemental sulfur, as well as those compounds known in the art to be sulfur donor compounds (e.g. thiurams such as thiuram disulfide).

Curing agents are described in Kirk-Othmer, Encyclopedia of Chemical Technology, 365-468, (3rd Ed. 1982), particularly Vulcanization Agents and Auxiliary Materials, 390-402, A. Y. Coran, Vulcanization in Encyclopedia of Polymer Science and Engineering, (2nd Ed. 1989), Frederick R. Erich, Science and Technology of Rubber, Chapter 7, Academic Press (1978), Robert F. Ohm, The Vanderbilt Rubber Handbook, pp. 92-122 (13th Ed. 1990), Krishna C. Baranwal & Howard L. Stephens, Basic Elastomer Technology, Chapter 9, (1st Ed. 2001), and Maurice Morton, Rubber Technology, Chapter 10, (2nd Ed. 1981), which are incorporated herein by reference.

In one or more embodiments, the cure system includes a sulfur crosslinking agent, zinc oxide, and/or magnesium oxide.

Other ingredients that may be employed include for example, but not limited to, accelerators, oils, waxes, scorch inhibiting agents, processing aids, zinc oxide, tackifying resins, reinforcing resins, fatty acids such as stearic acid, peptizers, antiozonants, and one or more additional rubbers.

In one or more embodiments, the amount of filler within the vulcanizable composition may be expressed as a volume percent of the vulcanizable composition. In one or more embodiments, at least 12%, in other embodiments at least 15%, and in other embodiments at least 18% of the volume of the vulcanizable composition includes filler. In these or other embodiments, less than 27%, in other embodiments less than 25%, and in other embodiments less than 22% of the volume of the vulcanizable composition includes filler.

In one or more embodiments, the amount of filler within the vulcanizable composition of the present invention may also be expressed with respect to the weight of the rubber component. In one or more embodiments, the vulcanizable composition includes at least 1 parts by weight, in other embodiments at least 10 parts by weight, in other embodiments at least 20 part by weight, in other embodiments at least 40 parts by weight, and in other embodiments at least 60 parts by weight filler per 100 parts by weight rubber. In these or other embodiments, the vulcanizable composition includes less than 140 parts by weight, in other embodiments less than 120 parts by weight, in other embodiments less than 100 parts by weight, in other embodiments less than 90 parts by weight, and in other embodiments less than 80 parts by weight filler per 100 parts by weight rubber.

In one or more embodiments, the amount of boron nitride within the vulcanizable compositions of matter may be expressed as a volume percent of the overall volume of the filler. In one or more embodiments, at least 0.1%, in other embodiments at least 1%, and in other embodiments at least 2% of the volume of the filler component includes boron nitride. In these or other embodiments, up to 100%, in other embodiments less than 50%, in other embodiments less than 20%, in other embodiments less than 10%, in other embodiments less than 8%, and in other embodiments less than 7% of the volume of the filler component includes boron nitride. In one or more embodiments, the balance of the filler may include reinforcing filler such as carbon black or silica.

In one or more embodiments, the amount of boron nitride within the vulcanizable composition of the present invention may also be expressed with respect to the weight of the rubber component. In one or more embodiments, the vulcanizable composition includes at least 0.1 parts by weight, in other embodiments at least 0.5 parts by weight, in other embodiments at least 1 part by weight, in other embodiments at least 3 parts by weight, and in other embodiments at least 6 parts by weight boron nitride per 100 parts by weight rubber. In these or other embodiments, the vulcanizable composition includes less than 140 parts by weight, in other embodiments less than 80 parts by weight, in other embodiments less than 40 parts by weight, in other embodiments less than 20 parts by weight, and in other embodiments less than 12 parts by weight boron nitride per 100 parts by weight rubber.

The compositions of this invention can be prepared by employing conventional mixing techniques. In one or more embodiments, the rubber mixture may be prepared by forming an initial masterbatch that includes the rubber component and filler. This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Various ingredients can be added during these remills. Rubber compounding techniques and the additives employed therein are disclosed in Stephens, The Compounding and Vulcanization of Rubber, in Rubber Technology (2nd Ed. 1973).

In one or more embodiments, the pneumatic tire with the integral innerliner prepared according to the present invention demonstrates advantageously low air permeability.

In order to demonstrate the practice of the present invention, the following examples have been prepared and tested. The examples should not, however, be viewed as limiting the scope of the invention. The claims will serve to define the invention.

EXPERIMENTAL

Samples 1-7

Various rubber compositions, which may also be referred to as innerliner formulations, were prepared, cured, and tested for characteristics believed to be important in innerliners. Each formulation was prepared within a laboratory-scale internal mixer using conventional two-stage mixing techniques commonly employed in the art of making rubber formulations for tire components. In general, the curatives were introduced and mixed into the formulation within the second mix stage, which was conducted at temperatures below that which would otherwise cause a deleterious initiation of vulcanization.

The formulation was then sheeted on a two-roll mill to an appropriate thickness as required for particular molds for particular tests. For certain tests, the sheets were cured within a hydraulic press for 20 minutes at 160° C. Depending on the test specifications, test specimens were dye-cut to the desired shapes.

The ingredients employed in each formulation are set forth in Table I. The amounts for the ingredients as set forth in the tables are reported in parts by weight.

TABLE I

| Material | |
|---|---|
| Bromo Butyl Rubber | 90.00 |
| Natural Rubber | 10.00 |
| Carbon Black | 68.00 |
| Napthanic Oil | 9.00 |
| Resin | 5.00 |
| Resin | 8.50 |
| Stearic Acid | 2.00 |
| Austin Black | 3.95 |
| Zinc Oxide | 3.00 |
| Magnesium Oxide | 0.15 |

While keeping a constant volume fraction of total filler within the vulcanizable composition, carbon black and boron nitride powder were added in varying amounts as provided in Table II. One boron nitride powder employed was AC6004 (Momentive), which was believed to be a single-crystal hexagonal platelets characterized by a particle size of about 12-13 micrometers. The other boron nitride was PT110 (Momentive), which was believed to be large single-crystal powders in the typical hexagonal platelet shape with an average particle size of about 45 micrometers. Also provided in Table II are the results of testing performed on each sample.

TABLE II

| | Sample | | | | | | |
|---|---|---|---|---|---|---|---|
| | 1 | 2 | 3 | 4 | 5 | 6 | 7 |
| Filler | | | | | | | |
| Carbon Black | 68 | 67.2 | 63.8 | 59.5 | 67.2 | 63.8 | 59.5 |
| AC6004 | 0 | 1 | 5 | 10 | 0 | 0 | 0 |
| PT110 | 0 | 0 | 0 | 0 | 1 | 5 | 10 |
| Properties | | | | | | | |
| Cure Time t90 (min) | 12.73 | 12.29 | 11.93 | 13.00 | 11.85 | 12.27 | 11.32 |
| Strain Sweep (60° C.) | | | | | | | |
| ΔG' (Mpa) 60° C. [0.25-14%], 10 Hz | 2.29 | 2.05 | 2.02 | 1.71 | 2.47 | 2.14 | 1.93 |
| ΔG' (Mpa) 30° C. [0.25-14%], 10 Hz | 4.02 | 3.78 | 3.26 | 3.24 | 4.38 | 3.69 | 3.51 |
| Temp Sweep @ 2%, 10 Hz | | | | | | | |
| G' (60° C.) | 3.74 | 3.59 | 3.40 | 3.16 | 3.79 | 3.64 | 3.62 |
| G' (30° C.) | 6.39 | 5.81 | 5.77 | 5.12 | 5.96 | 6.00 | 5.59 |
| TENSILE (23° C.) | | | | | | | |
| 100% Modulus (Mpa) | 1.49 | 1.39 | 1.41 | 1.52 | 1.32 | 1.33 | 1.36 |
| Elongation (%) | 642.20 | 656.62 | 682.58 | 696.86 | 661.67 | 615.92 | 669.72 |
| Toughness (Mpa) | 28.48 | 27.16 | 29.95 | 31.00 | 28.07 | 24.04 | 27.67 |

TABLE II-continued

| | Sample | | | | | | |
|---|---|---|---|---|---|---|---|
| | 1 | 2 | 3 | 4 | 5 | 6 | 7 |
| TENSILE (100° C.) | | | | | | | |
| 100% Modulus (Mpa) | 0.51 | 0.48 | 0.49 | 0.53 | 0.45 | 0.47 | 0.47 |
| Elongation (%) | 780.68 | 825.29 | 836.58 | 810.63 | 794.00 | 768.25 | 485.52 |
| Toughness (Mpa) | 16.72 | 16.57 | 17.54 | 15.76 | 15.61 | 14.72 | 14.11 |

Samples 8-10

Two additional samples were prepared by completely replacing the carbon black with boron nitride while maintaining the volume fraction of filler within the samples. Otherwise the ingredients and procedures employed were the same as those in the previous examples. Table III provides the type and amount of boron nitride employed, as well as the results of physical testing. Sample 8 is the same as Sample 1 above and included for comparative purposes.

TABLE III

| | Sample No | | |
|---|---|---|---|
| | 8 | 9 | 10 |
| Filler | | | |
| Carbon Black | 68 | 0 | 0 |
| AC6004 | 0 | 80.5 | 0 |
| PT110 | 0 | 0 | 80.5 |
| Properties | | | |
| Cure Time t90 (min) | 12.73 | 17.65 | 12.38 |
| Strain Sweep (60° C.) | | | |
| ΔG' (Mpa) 60° C. [0.25-14%], 10 Hz | 2.29 | 0.50 | 0.39 |
| ΔG' (Mpa) 30° C. [0.25-14%], 10 Hz | 4.02 | 0.68 | 0.50 |
| Temp Sweep @ 2%, 10 Hz | | | |
| G' (60° C.) | 3.74 | 2.63 | 2.33 |
| G' (30° C.) | 6.39 | 3.78 | 3.25 |
| TENSILE (23° C.) | | | |
| 100% Modulus (Mpa) | 1.49 | 1.69 | 1.23 |
| Elongation (%) | 642.20 | 574.89 | 569.20 |
| Toughness (Mpa) | 28.48 | 14.12 | 9.63 |
| TENSILE (100° C.) | | | |
| 100% Modulus (Mpa) | 0.51 | 0.49 | 0.43 |
| Elongation (%) | 780.68 | 786.25 | 458.78 |
| Toughness (Mpa) | 16.72 | 5.86 | 2.08 |

Air Permeability Tests

Certain samples prepared above were selected and tested for air permeability by using a Mocon Diffusivity tester. The results of the tests are provided in Table IV along with a description of the filler system.

TABLE IV

| Sample No. | Boron Nitride Type | Boron Nitride Amount (phr) | Carbon Black Amount (phr) | Mocon Diffusivity |
|---|---|---|---|---|
| 8 | N/A | 0 | 68 | 19.0 |
| 10 | PT110 | 80.5 | 0 | 9.35 |
| 9 | AC6004 | 80.5 | 0 | 8.8 |
| 5 | PT110 | 1 | 67.2 | 14.8 |
| 6 | PT110 | 5 | 63.8 | 13.8 |
| 7 | PT110 | 10 | 59.5 | 16.9 |
| 2 | AC6004 | 1 | 67.2 | 14.8 |
| 3 | AC6004 | 5 | 63.8 | 13.6 |
| 4 | AC6004 | 10 | 59.5 | 16.8 |

Various modifications and alterations that do not depart from the scope and spirit of this invention will become apparent to those skilled in the art. This invention is not to be duly limited to the illustrative embodiments set forth herein.

What is claimed is:

1. A tire comprising:
an innerliner, where the innerliner is prepared from a vulcanizable composition including rubber and a filler component, where the filler component includes particles consisting essentially of boron nitride, carbon black, and optionally clay, the vulcanizable composition including at least 10 parts by weight of the filler component per 100 parts by weight rubber and less than 80 parts by weight of the filler component per 100 parts by weight rubber, and between 1 and 10 parts by weight particles consisting essentially of boron nitride per 100 parts by weight rubber, where the particles consisting essentially of boron nitride are characterized by the mean size of their largest dimension, where the mean size of their largest dimension is less than 25 μm, and where the innerliner has an air permeability of less than 16.8 as measured by a Mocon Diffusivity tester.

2. The tire of claim 1, where the vulcanizable composition includes at least 3 parts by weight particles consisting essentially of boron nitride per 100 parts by weight rubber.

3. The tire of claim 2, where the boron nitride is characterized by a hexagonal crystal structure.

4. The tire of claim 1, where the rubber is a halogenated rubber.

5. The tire of claim 1, where the vulcanizable composition includes at least 40 parts by weight of the filler component per 100 parts by weight rubber.

6. The tire of claim 5, where the vulcanizable composition includes approximately 5 parts by weight of the particles consisting essentially of boron nitride per 100 parts by weight rubber.

7. The tire of claim 6, where the balance of the filler component includes carbon black or clay.

8. The tire of claim 6, where the vulcanizable composition includes at least 60 parts by weight of the filler component per 100 parts by weight rubber.

9. The tire of claim 1, where the particles consisting essentially of boron nitride are characterized by a nano particle structure having a largest dimension between 0.01 μm and 1 μm.

10. The tire of claim 1, where the vulcanizable composition includes approximately 5 parts by weight of the particles consisting essentially of boron nitride per 100 parts by weight rubber.

11. The tire of claim 1, where the mean size of the largest dimension of the particles consisting essentially of boron nitride is between 1 μm and 25 μm.

12. The tire of claim 1, where the mean size of the largest dimension of the particles consisting essentially of boron nitride is between 1 μm and 15 μm.

13. The tire of claim 1, where the mean size of the largest dimension of the particles consisting essentially of boron nitride is about 12 μm to 13 μm.

14. A vulcanizable tire innerliner composition comprising:
a rubber; and
a filler component,
where the filler component includes particles consisting essentially of boron nitride and carbon black, the vulcanizable composition including at least 10 parts by weight of the filler component per 100 parts by weight rubber and less than 80 parts by weight of the filler component per 100 parts by weight rubber, and between 1 and 10 parts by weight particles consisting essentially of boron nitride per 100 parts by weight rubber, where the particles consisting essentially of boron nitride are characterized by the mean size of their largest dimension, where the mean size of their largest dimension is less than 25 μm.

15. The vulcanizable tire innerliner composition of claim 14, where the vulcanizable composition includes approximately 5 parts by weight of the particles consisting essentially of boron nitride per 100 parts by weight rubber.

16. The vulcanizable tire innerliner composition of claim 14, where the vulcanizable composition includes at least 60 parts by weight of the filler component per 100 parts by weight rubber and approximately 5 parts by weight of the boron nitride per 100 parts by weight rubber.

17. The vulcanizable tire innerliner composition of claim 14, where the mean size of the largest dimension of the particles consisting essentially of boron nitride is between 1 μm and 25 μm.

18. The vulcanizable tire innerliner composition of claim 14, where the mean size of the largest dimension of the particles consisting essentially of boron nitride is between 1 μm and 15 μm.

19. The vulcanizable tire innerliner composition of claim 14, where the mean size of the largest dimension of the particles consisting essentially of boron nitride is about 12 μm to 13 μm.

* * * * *